United States Patent [19]

Furuyama

[11] Patent Number: 4,850,324
[45] Date of Patent: Jul. 25, 1989

[54] SYSTEM FOR DETECTING ABNORMALITY OF A COMBUSTION ENGINE

[75] Inventor: Masaaki Furuyama, Hohya, Japan

[73] Assignee: Fuji Jukogyo Kabushiki Kaisha, Tokyo, Japan

[21] Appl. No.: 200,761

[22] Filed: May 31, 1988

[30] Foreign Application Priority Data

Jun. 5, 1987 [JP] Japan ................................ 62-141924

[51] Int. Cl.$^4$ ........................................... F02D 41/22
[52] U.S. Cl. ....................................... 123/479; 123/486
[58] Field of Search ............... 123/479, 480, 486, 489; 364/431.05, 431.11

[56] References Cited

U.S. PATENT DOCUMENTS

| | | | |
|---|---|---|---|
| 4,345,561 | 8/1982 | Kondo et al. | 123/486 |
| 4,543,937 | 10/1985 | Amano et al. | 123/491 |
| 4,644,920 | 2/1987 | Abe et al. | 123/486 |

FOREIGN PATENT DOCUMENTS 55-112695  8/1980  Japan .
57-18440   1/1982  Japan .

Primary Examiner—Andrew M. Dolinar
Attorney, Agent, or Firm—Martin A. Farber

[57] ABSTRACT

A learning control system has a table storing learning coefficients in divisions thereof. An abnormality detecting system has a section for determining a number of updating times of coefficients in the table, and for determining a fact that a number of divisions in which each coefficient is out of a predetermined limit range is larger value than a predetermined second number. The section produces an abnormality signal when a coefficent exceeding the limit range in a particular division is updated a number of times more than a predetermined number of times. In accordance with the abnormality signal, all of coefficients in the table are held to a standard value.

4 Claims, 4 Drawing Sheets

FIG. 4

SYSTEM FOR DETECTING ABNORMALITY OF A COMBUSTION ENGINE

BACKGROUND OF THE INVENTION

The present invention relates to a system for detecting an abnormality of an automotive engine for a motor vehicle, and more particularly to a system which detects an abnormality by deviations of learning coefficients.

In one type of electronic fuel-injection control, the amount of fuel to be injected into the engine is determined in accordance with engine operating variables such as mass air flow, engine speed and engine load. The amount of fuel is determined by an injection pulse width. Basic injection pulse width $T_P$ can be obtained by the following formula.

$$T_P = K \times Q/N$$

where Q is mass air flow, N is engine speed, and K is a constant.

Desired injection pulse width $T_i$ is obtained by correcting the basic injection pulse $T_P$ with engine operating variables. In a learning control system, the desired injection pulse width is calculated by a following equation.

$$T_i = T_P \times (COEF) \times \alpha \times K_a$$

where COEF is a coefficient obtained by adding various correction or compensation coefficients such as coefficients on coolant temperature, full throttle open, engine load, etc., $\alpha$ is a feedback correcting coefficient of an $O_2$-sensor provided in an exhaust passage, and $K_a$ is a correcting coefficient by learning (hereinafter called learning coefficient). Coefficients, such as coolant temperature coefficient and engine load, are obtained by looking up tables in accordance with sensed informations. The value of the learning coefficient $K_a$ is derived from a RAM in accordance with engine load.

In order to obtain these informations, various sensors are provided in the engine. Those sensors inherently deteriorate in output characteristics with time. Accordingly, if the air-fuel ratio deviates largely from a desired air-fuel ratio because of the deterioration of a sensor, a warning for abnormality of the engine should be given to a driver of the vehicle.

Japanese Patent Laid Open No. 55-112695 discloses a diagnose system in which the number of occurrences of an abnormal signal from a sensor is counted, and when the number exceeds a predetermined number, a warning is given.

However, in the engine, since the output of a sensor varies largely in accordance with engine operating conditions, such a system is not available.

On the other hand, in the learning control system, all the learning coefficients are arranged in a form of a lookup table comprising a plurality of rows and columns in accordance with the engine load. Coefficients in divisions at intersections of rows and columns are initially set to the same value, that is the number "1". This is caused by the fact that the fuel supply system is to be designed to provide the most proper amount of fuel without the coefficient $K_a$. However, every automobile can not be manufactured to have a desired function, resulting in same results. Accordingly, the coefficients $K_a$ are updated by learning at every automobile, when it is actually used. If an abnormality occurs in the engine, the learning coefficients are largely changed by the updating. When a coefficient in a division exceeds a predetermined limit range, the division is registered as an abnormal division When the number of registered abnormal divisions exceeds a predetermined number, it is determined that the air-fuel ratio control system becomes abnormal. The abnormality is warned and the value of each coefficient is set to one for the fail-safe.

There are a common driving condition range in which the motor vehicle is commonly driven and common divisions included in common driving condition range. Accordingly, the common divisions are frequently updated and liable to be registered as abnormal divisions earlier than other divisions. If the predetermined number of the abnormal divisions for the detection of abnormality is larger than the number of the common divisions, the coefficients in divisions other than the common divisions are rarely updated. As a result, the detection of abnormality retards. To the contrary, if the number of the abnormal divisions is smaller than the number of the common divisions, the system is regarded as abnormal in spite of slight noises.

SUMMARY OF THE INVENTION

The object of the present invention is to provide a system which may exactly detect the abnormality of an engine by abnormal coefficients in the common divisions.

Accordingly to the present invention, there is provided a system for detecting abnormality of a combustion engine having a fuel injector, the system having a table provided with a plurality of divisions each of which storing a coefficient, detector means for detecting the operating condition of the engine and for producing a feedback signal dependent on the condition, a calculator for producing a basic fuel injection pulse width in accordance with engine operating conditions, corrector means for correcting the basic fuel injection pulse width by a coefficient derived from the table and by the feedback signal, updating means for updating coefficients in the table with values relative to the feedback signal, and abnormal coefficient detector means. The abnormal coefficient detector means comprising first means for determining a number of updating times larger than a predetermined first number of times and for producing a first signal, second means responsive to the first signal for determining a fact that a number of divisions in which each coefficient is out of a predetermined limit range is larger value than a predetermined second number and for producing a second signal, third means responsive to the second signal for deriving a fact that a coefficient exceeding the limit range in a particular division is updated a number of times more than a predetermined number of times, and for producing an abnormality signal, holding means responsive to the abnormality signal for holding all of coefficients in the table to a standard value.

In an aspect of the invention, the particular division is determined in accordance with engine operating conditions, and the third means produces the abnormality signal when the coefficient is successively updated more than the predetermined number of times. The system further comprises a warning indicator responsive to the abnormality signal for indicating the abnormality.

BRIEF DESCRIPTION OF DRAWINGS

FIG. 4 is a lookup table storing learning coefficients.

DETAILED DESCRIPTION OF THE PREFERRED EMBODIMENT

Figure 1:
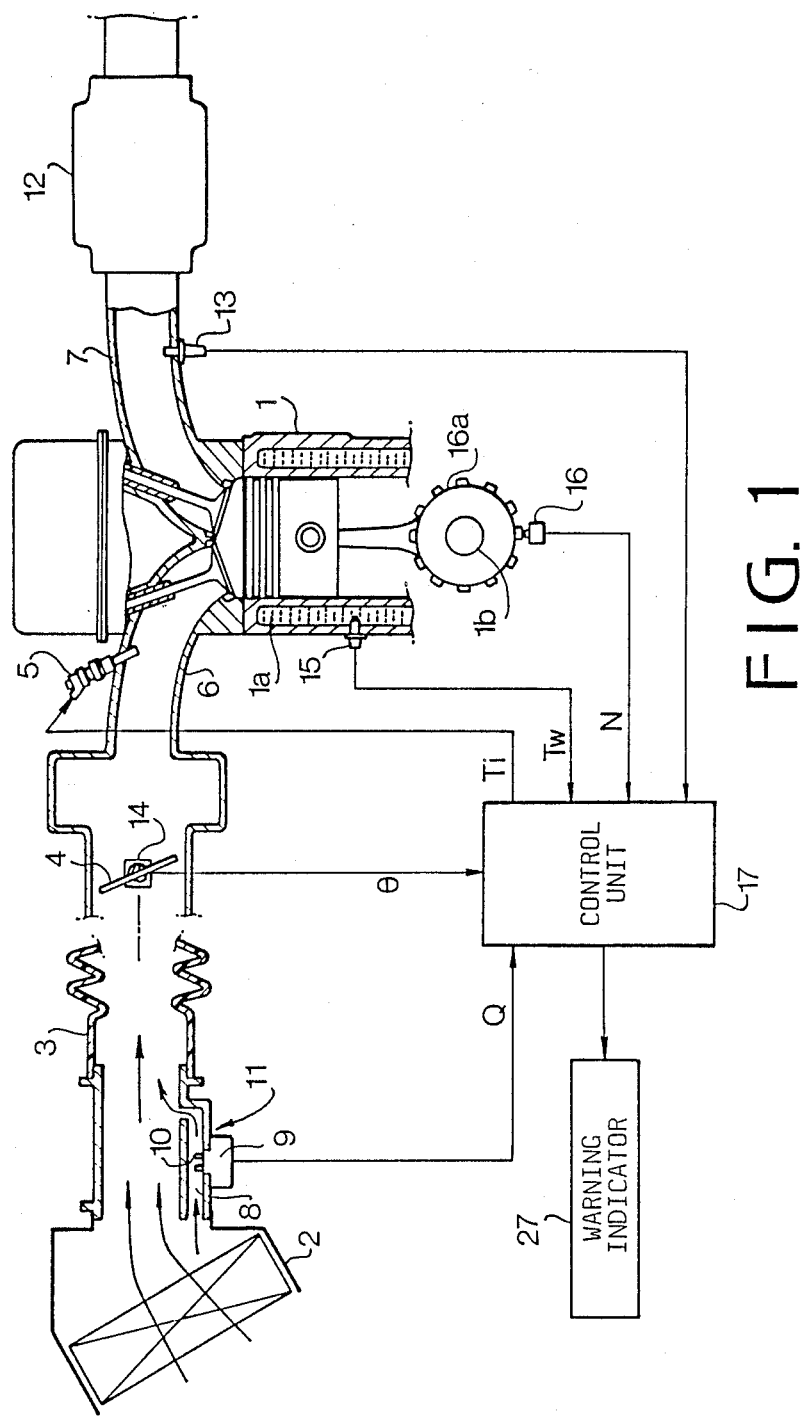
FIG. 1 is a schematic illustration showing a fuel injection system for an automotive engine according to the present invention.

Referring to FIG. 1, an internal combustion engine 1 for a vehicle is supplied with air, passing through an air cleaner 2, an intake pipe 3, a throttle valve 4, and an intake manifold 6. A mass air flow meter 11 is provided in a bypass 8 at the downstream of the air cleaner 2. The air flow meter 11 comprises a hot wire 10 for detecting the quantity of intake air in the intake pipe 3 and a temperature compensator plug 9. An output signal of the air flow meter 11 is supplied to an electronic control unit 17 comprising a microcomputer. An $O_2$ sensor 13 and a catalytic converter 12 are provided in an exhaust passage 7. A throttle position sensor 14 is provided adjacent the throttle valve 4 for producing a throttle position signal $\theta$. A coolant temperature sensor 15 is provided on a water jacket $1a$ of the engine 1 for producing a temperature signal Tw. A crank angle sensor 16 is mounted adjacent a disk $16a$ secured to a crankshaft $1b$ of the engine 1 for detecting engine speed. Output signals from these sensors 13, 14, 15 and 16 are supplied to the control unit 17. The control unit 17 determines a pulse width for fuel injected from injectors 5.

Figure 2:
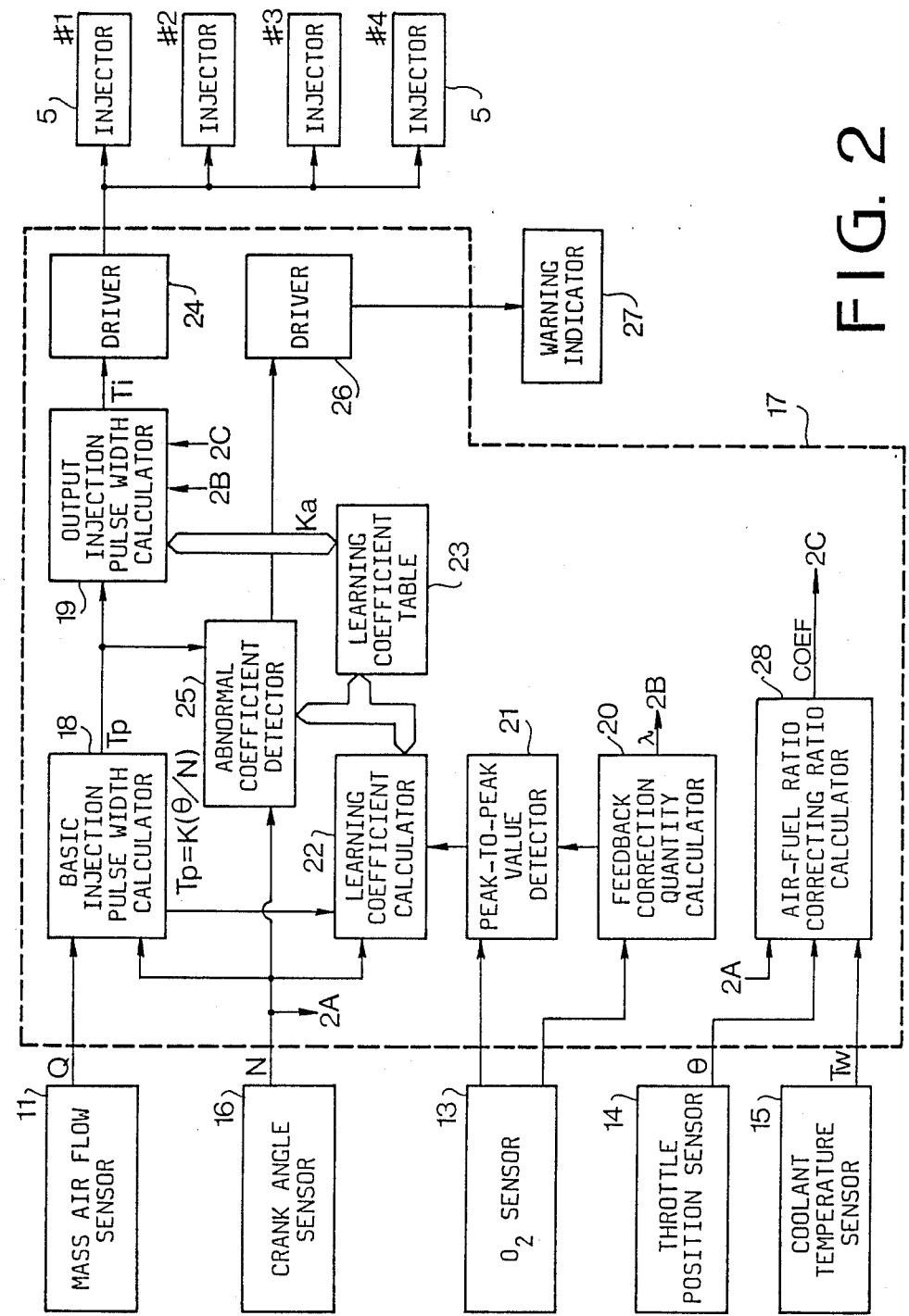
FIG. 2 is a block diagram of the system of the present invention.

Referring to FIG. 2, the control unit 17 has a basic injection pulse width calculator 18 which is supplied with an air flow signal Q representing intake air quantity at the air flow meter 11 and with an engine speed signal N from the crank angle sensor 16 for calculating a basic injection pulse width Tp.

The output signal Tp is applied to an output injection pulse width calculator 19, where an output injection pulse width Ti is calculated by correcting the basic injection pulse width Tp in accordance with engine operating conditions as described hereinafter. A feedback correction quantity calculator 20 is provided for calculating a feedback correcting value λ in accordance with a feedback signal from the $O_2$ sensor 13.

Figure 4:
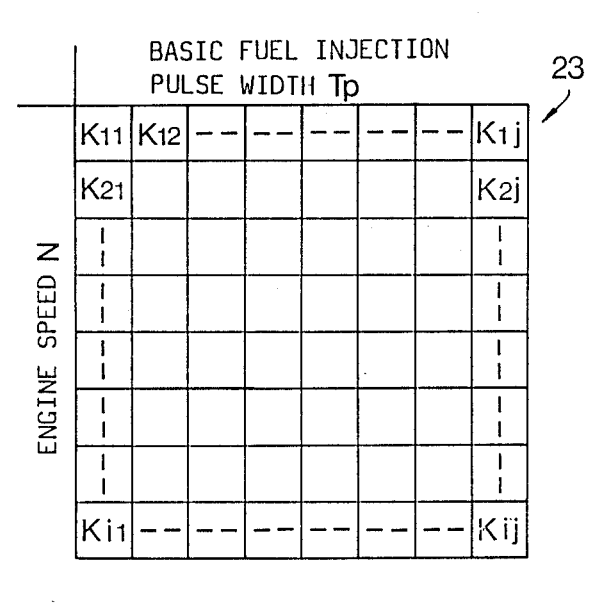

An air-fuel ratio correcting coefficient calculator 28 produces a correcting coefficient in accordance with the engine speed signal N, throttle position signal 8 and temperature signal Tw. A peak-to-peak value detector 21 is supplied with an output signal of the $O_2$ sensor and with the feedback correcting value from the calculator 20, and produces a peak-to-peak value signal. The control unit 17 further comprises a learning coefficient calculator 22 and a learning coefficient table 23 connected to the calculators 19 and 22 by bass lines. As shown in FIG. 4, the learning coefficient table 23 is a three-dimensional table having a plurality of divisions (8×8=64), each storing a learning coefficient Ka. The division is divided in accordance with engine speed N and basic injection pulse width Tp which represent the engine load.

The learning coefficient calculator 22 calculates an arithmetical average LMD of maximum and minimum values in the output of the peak-to-peak value detector 21 and calculates a new learning coefficient Kn by the following equation.

$$Kn = Ka + M \cdot \Delta LMD$$

where $\Delta LMD$ is a difference of the LMD from a desired value in feedback control, and M is a constant.

Further, the calculator 22 detects a corresponding division in accordance with engine speed N and basic injection pulse width Tp and updates the coefficient Ka in the detected division with the new coefficient Kn, when a steady state of engine operation continues during a predetermined cycles of the output signal of the $O_2$ sensor 13.

The output injection pulse width calculator 19 calculates the output injection pulse width Ti based on the outputs of the calculators 18, 20 and 28 and the updated coefficient derived from the table 23. The pulse width Ti is supplied to injectors 5 through a driver 24.

In accordance with the present invention, an abnormal coefficient detector 25 connected to the table 23 by a bass line is provided for detecting corresponding divisions in accordance with engine speed N and basic injection pulse width Tp, and for producing an abnormality signal as described hereinafter. The abnormality signal is fed to a warning indicator 27 through a driver 26.

Figure 3:
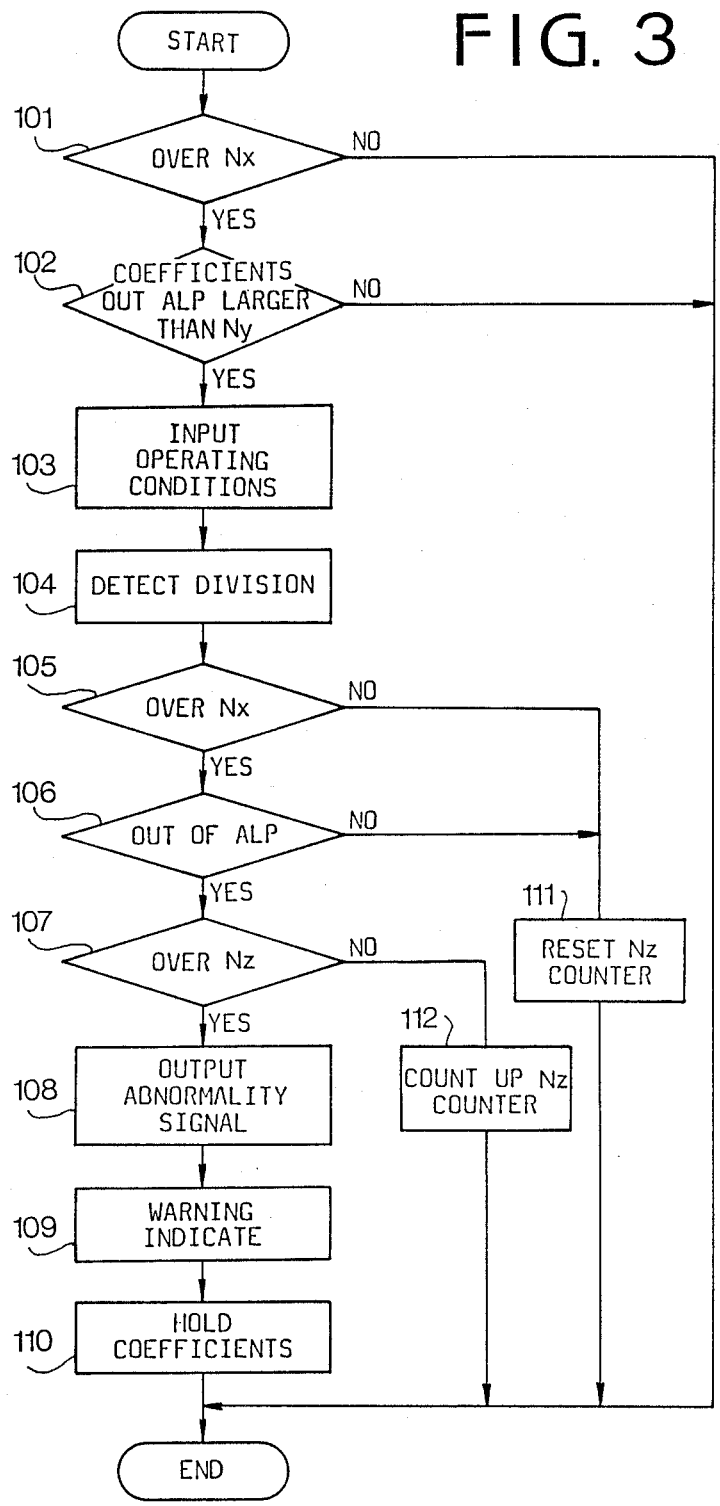
FIG. 3 is a flow chart showing the operation of the system.

The abnormality detecting operation will be described hereinafter with reference to FIG. 3. There is provided a predetermined number Nx for the whole sum of updating times, a predetermined limit range ALP for the value of learning coefficient, a predetermined number Ny for updated divisions, and a predetermined number of times Nz for the sum of successive updating times in one division. The number of updating times is counted by a counter at every updating of a coefficient in the table.

At a step 101, it is determined whether the number of updating times exceeds the predetermined number Nx. When the number of updating times is smaller than the number Nx, the program exits the routine. If the updating exceeds the set number Nx, even if at only one division of the table, the program proceeds to a step 102. At step 102, it is determined whether the number of divisions coefficients in which exceed the limit range ALP exceeds the predetermined number Ny. The range ALP is, for example, ±20% of the initial one (that is K = 0.8 ~ 1.2). If the number of divisions is larger than the number Ny, the program goes to a step 103 where the present engine operating condition is detected from engine speed N and basic fuel injection pulse width Tp. At a step 104, a division in the table which corresponds to the detected engine operating condition is detected. At a step 105, it is determined whether the number of updating times at the detected division exceeds the set number Nx. If the number is smaller than the set number Nx, an Nz counter for the number Nz is reset at a step 111. When the number is larger than the number Nx, it is determined whether the value of the coefficient in the detected division is out of the limit range ALP at a step 106. If the answer is YES, it is determined whether the coefficient in the detected division is successively updated a number of times more than the predetermined number of times Nz (Nz>2). If the updating times is smaller than the times Nz, the Nz counter is counted up by one at a step 112. If the coefficient is successively updated more than the times Nz, the abnormality signal is produced from the abnormal coefficient detector 25 at a step 108. Further, at a step 109, the abnormality is indicated by the warning indicator 27. At the same time, at a step 110, the abnormal coefficient detector 25 supplies a hold signal to the learning coefficient calculator 22 which operates to hold all of coefficients in the table to the standard value one (Ka =1).

In accordance with the present invention, since the number of updating times as a whole is determined, after which a coefficient in a particular division is detected to determine the abnormality, the detection is exactly performed.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A system for detecting abnormality of a combustion engine having a fuel injector, the system having a table provided with a plurality of divisions each of which storing a coefficient, detector means for detecting the operating condition of the engine and for producing a feedback signal dependent on the condition, a calculator for producing a basic fuel injection pulse width in accordance with engine operating conditions, corrector means for correcting the basic fuel injection pulse width by a coefficient derived from the table and by the feedback signal, updating means for updating coefficients in the table with values relative to the feedback signal, and abnormal coefficient detector means, the abnormal coefficient detector means comprising:

first means for determining a number of updating times larger than a predetermined first number of times and for producing a first signal;

second means responsive to the first signal for determining a fact that a number of divisions in which each coefficient is out of a predetermined limit range is larger value than a predetermined second number, and for producing a second signal;

third means responsive to the second signal for determining a fact that a coefficient exceeding the limit range in a particular division is updated a number of times more than a predetermined number of times, and for producing an abnormality signal;

holding means responsive to the abnormality signal for holding all of coefficients in the table to a standard value.

2. The system according to claim 1 wherein the particular division is determined in accordance with engine operating conditions.

3. The system according to claim 1 wherein the third means produces the abnormality signal when the coefficient is successively updated more than the predetermined number of times.

4. The system according to claim 1 further comprising a warning indicator responsive to the abnormality signal for indicating the abnormality.

* * * * *